United States Patent [19]

Ko et al.

[11] Patent Number: 4,459,856
[45] Date of Patent: Jul. 17, 1984

[54] CMOS BRIDGE FOR CAPACITIVE PRESSURE TRANSDUCERS

[75] Inventors: Wen-Hsiung Ko; Cliff D. J. Fung, both of Cleveland Heights, Ohio; Wei-Jiun Shen, Sunnyvale, Calif.

[73] Assignee: Case Western Reserve University, Cleveland, Ohio

[21] Appl. No.: 440,575

[22] Filed: Nov. 10, 1982

[51] Int. Cl.³ .............................................. G01L 19/04
[52] U.S. Cl. ........................................ 73/754; 73/708; 73/724; 73/780
[58] Field of Search ................. 73/708, 718, 724, 754, 73/753; 307/115, 321

[56] References Cited
U.S. PATENT DOCUMENTS

| | | | |
|---|---|---|---|
| 3,869,676 | 3/1975 | Harrison et al. | 329/204 |
| 4,149,096 | 4/1979 | Holzner | 307/115 |
| 4,215,277 | 7/1980 | Weiner | 307/115 X |
| 4,289,035 | 9/1981 | Lee | 73/718 X |
| 4,387,601 | 6/1983 | Azegami | 73/718 X |
| 4,422,335 | 12/1983 | Ohnesurge | 73/708 X |

Primary Examiner—Gerald Goldberg
Assistant Examiner—Vincent P. Kovalick
Attorney, Agent, or Firm—Fay & Sharpe

[57] ABSTRACT

A fixed reference capacitance (10) and a variable, pressure sensitive capacitance (12) are defined by a common conductive layer (14), and a common dielectric layer (16). A peripheral conductive layer 20 completes the reference capacitor and a central conductive layer (22) completes the variable capacitor. A peripheral supporting layer or structure (18) prevents the thickness or the dielectric constant of the dielectric layer peripheral portion but not the central portion from varying in response to pressure changes. In this manner, the reference and variable capacitors may be placed closely adjacent without pressure isolating the reference capacitor. An oscillator (30) provides an AC, such as square wave, driving signal to first and second temporary storage capacitors (52, 54). A bridge (70) of CMOS transistors selectively connects the first and second storage capacitors with the reference and variable capacitors. A gating control circuit (90) selectively gates the CMOS transistors of the bridge conductive and nonconductive such that during a positive square wave half cycle, the first storage capacitor is connected with the reference capacitor and the second storage capacitor is connected with the variable capacitor and during a negative half cycle the first storage capacitor is connected with the variable capacitor and the second storage capacitor is connected with the reference capacitor.

25 Claims, 4 Drawing Figures

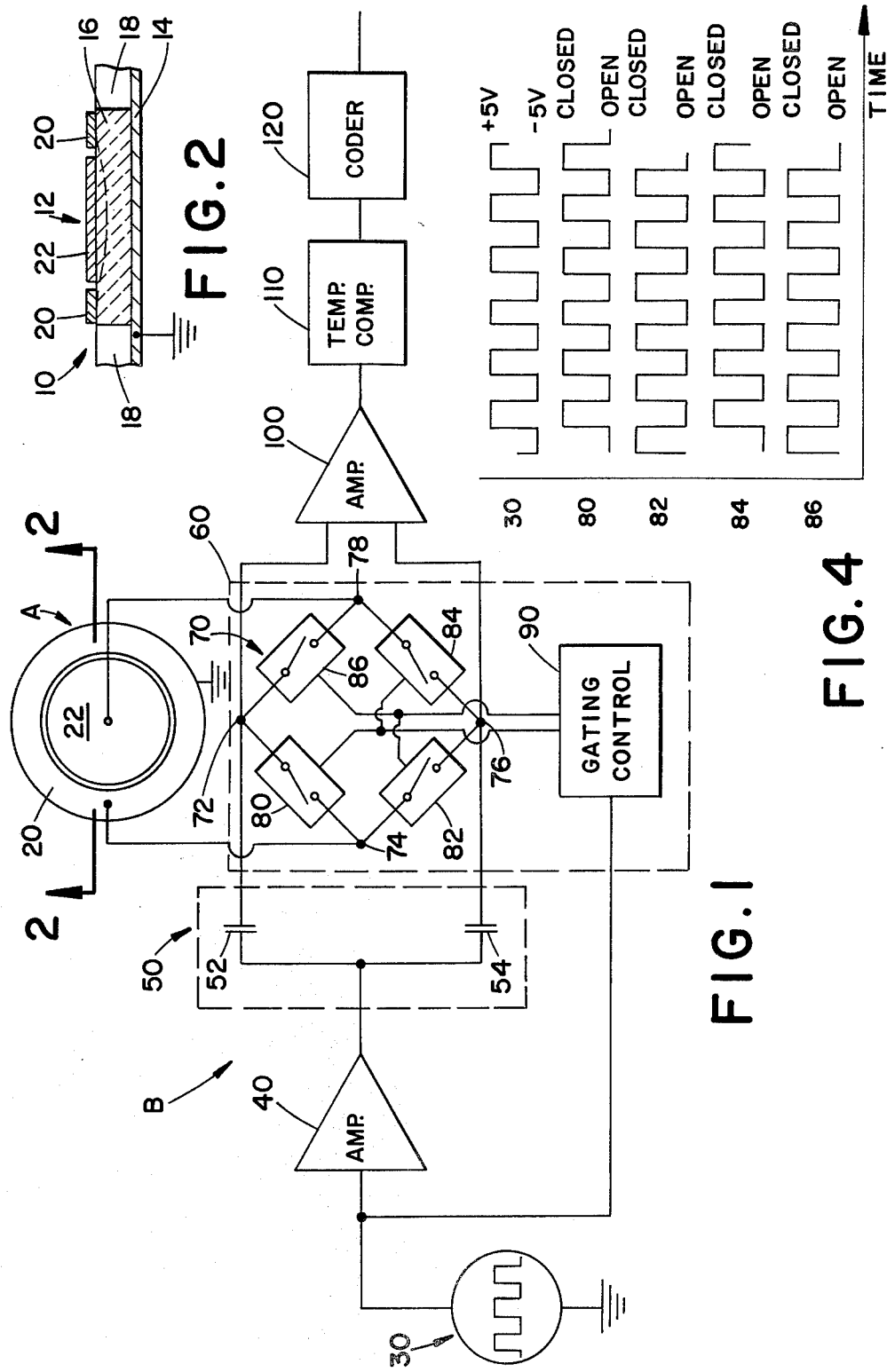

CMOS BRIDGE FOR CAPACITIVE PRESSURE TRANSDUCERS

BACKGROUND OF THE INVENTION

The present invention relates to impedance discrimination circuitry for accurately measuring small impedance differences. The invention finds particular application as a pressure transducer for measuring pressure-related impedance variations. It is to be appreciated, however, that the invention may also be applicable to measuring other physical phenomenon which cause impedance variations such as temperature, force, flow, acceleration, chemical concentration, and the like.

Heretofore, capacitive pressure transducers have commonly included an oscillator whose frequency varies with pressure. More specifically, a pressure sensitive capacitive element at least in part has controlled the frequency of an oscillator. Commonly, the oscillator has a high frequency and undergoes a relatively small frequency change, e.g. 0.1% to 01.0%, over the range of measured pressures. A demodulation circuit has normally been required to reduce the high frequency to a usable range. This small frequency change has been difficult to interpolate accurately over the time and measured pressure range. Further, frequency variations are caused not only by pressure, but also by time, temperature, and the like. Accordingly, precision capacitive pressure measurements have been difficult to attain, unless the capacitance is large.

A pressure transducer whose output varies in proportion to pressure, or more specifically, to a pressure related capacitance variation, is illustrated in U.S. Pat. No. 3,869,676, issued March 1975 to D. R. Harrison, et al. In the Harrison, et al. patent, a sinusoidal oscillator is connected by like capacitive couplings with opposite terminals of a circularly arranged diode bridge. A reference capacitor and a variable capacitor are connected between the other diode bridge terminals, respectively, and ground. The sine wave from the oscillator causes the diodes to be forward and reverse biased in such a manner that charge moves from a first of the capacitive couplings to the reference capacitor and from the a second of the capacitive couplings to the variable capacitor during a positive-going since wave half cycle. During a negative half cycle, charge flows from the reference capacitor through the diode bridge to the second capacitive coupling and from the variable capacitor to the first capacitive coupling. If the references and the variable capacitors are not equal, this cyclic charge movement causes a charge build up, and therefore a bias voltage on one of the first and second capacitive couplings and a charge deficit on the other. The charge segregation on the first and second capacitive couplings is proportional to the difference in capacitance of the reference and variable capacitors.

One of the problems with the Harrison, et al. circuit is that the diodes have a limited linear range. Commonly, a diode saturates at about 600 millivolts forward bias and has a linear acceptable output up to about 300 millivolts. Further, the reference and variable capacitors at no pressure signal may introduce about a 100 millivolt offset which reduces the linear range even further. This limited linear range, about 200 millivolts, limits the range of capacitance, hence pressure, variations which the circuit is adapted to measure. Further, the output voltage is dependent not only on the relative capacitance of the reference and variable capacitors, but also on the amplitude of the sine wave from the oscillator. The amplitude of a sine wave oscillator is difficult to control with an accuracy of better than one part in a thousand. This reduces the precision and accuracy of the measuring transducer. On the whole, the dynamic range of the Harrison, et al. circuit is limited to measuring about a plus or minus 4% variation in the capacitance of the variable capacitor at 5 volt supply voltage. Another problem with the Harrison, et al. circuit is that the reference capacitor must be isolated from the measured pressure.

The present invention contemplates a new and improved impedance transducer system which overcomes the above referenced problems and others.

SUMMARY OF THE INVENTION

In accordance with a first aspect of the present invention, there is provided an impedance discrimination circuit for measuring a sensed condition related impedance variation. At least first and second temporary charge storage means receive an AC driving input signal. At least one of a first and second impedance varies with the sensed condition. A switching circuit cyclically connects the first temporary charge storage means with the first and second impedances alternately in synchronization with the AC driving input and connects the second temporary storage means with the other of the first and second impedances alternately in synchronization with the AC driving input. In this manner, the switched connection between the first and second temporary charge storage means and the first and second impedances is cyclically reversed.

In accordance with another aspect of the invention, there is provided an integrated circuit chip which provides an output signal that varies in proportion to a sensed condition, such as pressure. An oscillator generates the AC driving input, such as a square wave, having alternating positive and negative half cycles. A driving amplifier means constrains the AC driving input to preselected positive and negative half cycle amplitudes. First and second temporary storage capacitors are operatively connected with the driving amplifier means. A bridge circuit has first, second, third, and fourth terminals. The first and third terminals are operatively connected with the first and second temporary storage capacitors, respectively. Four gated, solid state switching means are operatively connected between the four bridge terminals. A reference impedance is connected with the second terminal and a variable impedance is connected with the fourth terminal. A gating control means is operatively connected with the oscillator and the four gated, solid state switching means for closing the switching means between the first and second terminals and between the third and fourth terminals during each positive half cycle and for closing the switching means between the second and third terminals and between the fourth and first terminals during each negative half cycle. A buffer means is operatively connected with the first and third terminals for producing an output signal which varies in proportion to charge variations on the first and second temporary storage capacitors which, in turn, vary with variations in the impedance difference between the first reference and variable impedances.

In accordance with yet another aspect of the present invention, there is provided a capacitive pressure transducer in which a reference and a variable capacitor are both disposed adjacent to each other in the region in which pressure is to be measured. The reference capacitor is pressure insensitive and the variable capacitor is pressure sensitive. A capacitance difference measuring circuit is connected with the reference and variable capacitors and produces an output signal which varies in proportion to the capacitance difference.

One advantage of the present invention is that it has a large dynamic range. In the preferred embodiment, the output remains linear over a capacitance variation of about plus or minus 40%.

Another advantage of the present invention is that it has a relatively high output voltage. In the preferred embodiment, this output is on the order of several volts, and in particular, 50 to 70% of the AC driving input voltage.

Another advantage of the present invention is that it is suitable for use with a square wave generator which is more accurately controlled and has a higher efficiency than a sine wave generator.

Yet another advantage of the present invention is that it has a relatively low output impedance which facilitates the detection of small impedance variations and avoids interference and noise pick-up at the output leads.

Still further advantages of the present invention will become apparent to others upon reading and understanding the following detailed description of the preferred embodiment.

BRIEF DESCRIPTION OF THE DRAWINGS

The invention may take form in various components and arrangements of components. The drawings are only for purposes of illustrating a preferred embodiment of the invention only and are not to be construed as limiting it.

FIG. 1 is a block diagram illustrative of a pressure-sensitive transducer system in accordance with the present invention;

FIG. 2 is a sectional view through section 2—2 of the pressure-sensitive capacitor of FIG. 1;

DETAILED DESCRIPTION OF THE PREFERRED EMBODIMENT

Figure 3:
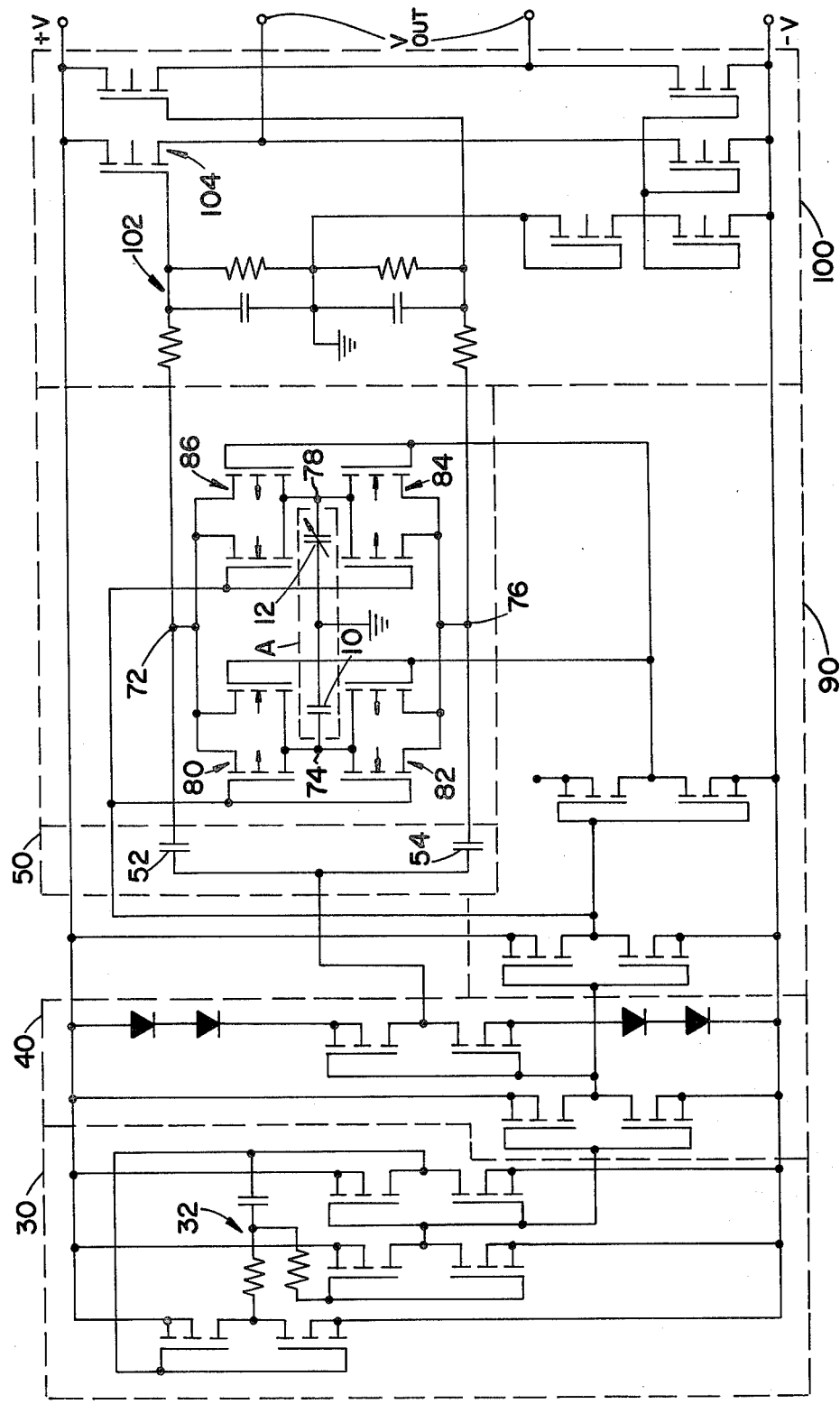
FIG. 3 is a detailed circuit diagram of a pressure transducer system in accordance with the present invention; and, FIG. 4 illustrates a preferred timing sequence for the switching means of FIGS. 1 and 2.

With reference to FIG. 1, the capacitive pressure transducer system includes a measured condition sensitive impedance means A whose impedance varies with variations in the measured condition. An impedance variation measuring circuit B measures the variations in the impedance and produces an output signal which varies with the impedance variations, hence the measured condition. In the preferred embodiment, the measured condition is pressure.

With continued reference to FIG. 1 and particular reference to FIG. 2, the impedance means A includes a reference impedance 10 and a measured condition, e.g. pressure, sensitive variable impedance 12. In the preferred embodiment, reference and variable impedances are capacitors which are constructed on a common substraight or common electrically conductive layer 14. A common dielectric layer 16 is deposited on the common conductive layer between measured condition insensitive, insulative wall portions 18 of an integrated circuit chip. The reference capacitor 10 is formed by placing a peripheral electrically conductive layer 20 around the peripheral portion of the dielectric layer. The insulative wall portions restrain the peripheral portion of the dielectric layer from changing an impedance varying physical property in response to the sensed or measured condition. The peripheral conductive layer, the common dielectric layer 16, and the common conductive layer 14 function as the reference capacitor. The variable capacitor is formed by placing a central conductive layer 22 on the central, most sensitive portion of the common dielectric layer. The central conductive layer 22, the common dielectric layer 16, and the common conductive layer 14 function as the variable capacitor. The surface area of the peripheral conductive layer 20 and the central conductive layer 22 are substantially the same, such that at a reference level of the measured condition, the reference and variable capacitors have substantially the same capacitance.

In the preferred embodiment, the variable capacitor is pressure sensitive. Specifically, the dielectric layer is compressed, as shown in exaggerated phantom in FIG. 2, with pressure variations to change the capacitance by changing the distance between the conductive layers. The pressure can vary the dielectric constant of the dielectric layer and other properties which vary the capacitance or other impedance characteristic of the variable impedance. The impedance may vary with exposure to a chemical substance which interacts with the dielectric layer to vary the dielectric constant, such as hydrogen, smoke, or the like. Also the dielectric constant or other impedance varying physical property may vary with ionization, acceleration, force, flow, gas concentration, and the like.

In the preferred embodiment, the common dielectric layer is circular, the peripheral conductive layer 20 is a circular annulus, and the central conductive layer 22 is a circular disc. In this manner, the reference and variable capacitor may be both positioned closely adjacent each other and subjected to the same pressure variations, yet only the variable capacitor is sensitive to the variations. This eliminates the need for special pressure shielding for the reference capacitor, placing the reference capacitor in a different compartment, and the like which may require compensation for other environmental changes such as temperature. Optionally, other combinations of reference and variable impedances may be used. For example, both the reference and variable capacitors may be pressure sensitive but with an opposite polarity such that their variations sum rather than cancel.

With primary reference to FIGS. 1 and 3, the impedance variation measuring circuit B includes an oscillator 30 which generates an AC driving input signal, in the preferred embodiment a square wave. The square wave includes alternate high or positive half cycles and low or negative half cycles. In the preferred embodiment, the oscillator is constructed with CMOS transistors and its frequency controlled by the RC time constant of an RC network 32. The CMOS transistors resistive and capacitive elements are formed as part of the integrated circuit chip. The RC time constant is selected such that the square wave has a cycle time which is smaller than an anticipated sampling interval of the output. To accommodate a sampling interval of 1 to 10 milliseconds, for example, a frequency on the order of 5 to 10 kHz. is satisfactory.

An amplifier and driver circuit or means 40 controls the amplitude of the positive and negative half cycles of the square wave driving input. In the preferred embodiment, the amplifier is constructed of CMOS transistors and diodes as an integral part of the integrated circuit chip. In the preferred embodiment, the amplifier driver fixes square wave precisely to plus and minus 5 volts.

The square wave is received as an AC driving input by a electrical energy temporary storage means 50 for storing a varying amount of electrical energy. In the preferred embodiment, the temporary storage means includes a pair of matched temporary storage capacitors 52 and 54 for storing electrical potential. Because the accuracy of the impedance difference measurement is affected by any differences in the capacitance of capacitors 52 and 54, it is preferred that they be matched as precisely as possible to the same capacitance. However, a fixed difference in the capacitors 52 and 54 merely produces an offset error in the output for which compensation can readily be made. In the preferred embodiment, the temporary storage capacitors are constructed as an integral part of the integrated circuit chip.

The capacitance of the temporary storage capacitors and the reference and variable capacitors is selected in conjunction with the oscillator frequency and the sampling interval. Specifically, the capacitance values are selected such that the charge levels are maintained in the temporary storage capacitors relatively long compared with the cycle time of the square wave but vary over short durations compared with the sampling interval.

A switching circuit 60 cyclically connects the first temporary storage capacitor 52 with the reference capacitor 10 and the variable capacitor 12 in synchronization with the square wave and alternately connects the second temporary storage capacitor 54 with the other of the reference and variable capacitors. More specifically, the switching circuit connects the first temporary storage capacitor to the reference capacitor and the second temporary storage capacitor to the variable capacitor during the positive half cycle of the square wave. During the negative half cycle, the first temporary storage capacitor is connected with the variable capacitor and the second temporary storage capacitor is connected with the reference capacitor. As explained in greater detail hereinafter, the amount of charge or electrical potential on the temporary storage capacitors 52 and 54 is the same when the reference and variable capacitors are of the same value. However, when the capacitances of the reference and variable capacitors are different, a corresponding potential difference in the charge stored on the temporary storage capacitors 52 and 54 results.

The switching circuit includes a bridge circuit 70 having four terminals, i.e., a first terminal 72, a second terminal 74, a third terminal 76, and a fourth terminal 78. The first and third terminals are connected with the temporary storage capacitors 52 and 54, respectively, and the second and fourth terminals are connected with the reference and variable capacitors 10 and 12, respectively. A first gated switching means 80 is connected between the first and second terminals; a second gated switching means 82 is connected between the second and third terminals; a third gated switching means 84 is connected between the third and fourth terminals; and, a fourth gated switching means 86 is connected between the fourth and first terminals. In the preferred embodiment, the gated switching means are CMOS transistors, although bipolar transistors and other solid state, gated switching means are also contemplated.

The switching circuit further includes a gating control means 90 which selectively gates the gated switching means 80, 82, 84, and 86 conductive and nonconductive in synchronization with the AC driving, square wave, input. With reference to FIG. 4, during the positive half cycle, switching means 80 and 84 are closed or gated conductive and switching means 82 and 86 are open to block the passage of current. During the negative half cycle, switching means 82 and 86 are closed or gated conductive and switching means 80 and 84 are open blocking the flow of current.

In operation, during each positive half cycle, electrical charge is driven from the first temporary storage capacitor 52 through closed switching means 80 to the peripheral conductive layer 20 of the reference capacitor 10. During each negative half cycle, electrical charge is drawn toward the first temporary storage capacitor 52 through the fourth switching means 86 from the central conductive layer 22 of the variable reference capacitor 12. Thus, if the charge stored on the reference capacitor during the positive half cycle matches the charge withdrawn from the variable capacitor during the negative cycle, there is no net charge accumulation or decrease on the first temporary storage capacitor. However, if the variable capacitor assumes a different capacitance from the reference capacitor, then a different amount of charge will be returned to the first temporary storage capacitor than was sent to the reference capacitor.

Analogously, during each positive half cycle, electrical charge is driven from the second temporary storage capacitor 54 through the third switching means 84 to the central conductive layer 22 of the variable capacitor 12. During each negative half cycle, charge is drawn to the second temporary storage capacitor 54 through closed second switching means 82 from the peripheral conductive layer 20 of the reference capacitor 10. In this manner, the charge driven to the variable capacitor is replaced with the charge drawn from the reference capacitor. Again, if the two capacitances are the same, there will be no net charge accumulation or decrease on the second temporary storage capacitor. As the relative capacitance of the reference and variable capacitor vary, a corresponding amount of charge build up occurs on one of the temporary storage capacitors and charge decrease occurs on the other. In the preferred embodiment, the charge accumulated on the temporary storage capacitors ranges between plus and minus 3 volts. It will be noticed that in comparison to this output voltage, the offset voltage, commonly with the present level of I.C. process control on the order of 0.1 volts, between the reference and variable capacitors is small.

A buffer amplifier or means 100 isolates the voltages on the temporary storage capacitors from the remaining circuitry such that sampling the output does not affect the voltage stored on the temporary storage capacitors. The buffer amplifier includes an isolation coupling 102 including capacitors which filters out the AC driving input frequency and an amplifier stage 104 for increasing the magnitude and decreasing the impedance of the output signal. More specifically, the buffer amplifier subtractively combines the stored potentials of on the temporary storage capacitors to double the size of the output signal. Again, the output amplifier is constructed of CMOS transistors, capacitors, and resistors which are integrally formed as a part of the integrated circuit chip.

A compensation circuit or means 110 adjusts the output signal to compensate, particularly remove, temperature sensitive variations in the output signal. Optionally, compensation may also be made for other factors such as age, time, or the like.

A coding means 120 transforms the analog output signal into the appropriate format to be used by down stream equipment, such as computers. Conventional coding means are available for converting the analog voltage signal into a digital signal, frequency encoded signal, or the like.

The invention has been described with reference to the preferred embodiment. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described a preferred embodiment of the invention, we now claim our invention to be:

1. An impedance discrimination circuit for measuring a sensed condition related impedance variation, the circuit comprising:
    at least first and second temporary charge input signal;
    first and second impedance means at least one of which varies with the sensed condition; and,
    gated switched circuit for cyclically connecting the first temporary charge storage means with the first and second impedance means alternately in synchronization with the a.c. driving input signal and for connecting the second temporary storage means with the other of the first and second impedance means alternately in synchronization with the AC driving input signal, whereby the switched connection between the first and second temporary charge storage means and the first and second impedance means is cyclically reversed.

2. The circuit as set forth in claim 1 wherein the switching circuit includes:
    a bridge including at least first, second, third, and fourth terminals, the first terminal operatively connected with the first temporary charge storage means, and the third terminal operatively connected with the second temporary charge storage means; the bridge further including, a first gated, solid state switching means operatively connected between the first and second terminals, a second gated, solid state switching means operatively connected between the second and third terminals, a third gated, solid state switching means operatively connected between the third and fourth terminals, and a forth gated, solid state switching means operatively connected between the fourth and first terminals; and,
    gating control means for closing the first and third switching means and opening the second and fourth switching means and alternately closing the second and fourth switching means and opening the first and third switching means in synchronization with the a.c. driving input signal, such that charge flows from the first temporary charge storage means through the first switching means to the first impedance means, from the first impedance means through the second switching means to the second temporary charge storage means, from the second temporary storage means through the third switching means to the second impedance means, from the second impedance means through the fourth switching means to the first temporary storage means, whereby a net charge accumulation builds up on one of the temporary charge storage means and a net charge deficit is created on the other of the temporary charge storage means which net charge accumulation and deficit are proportional to the difference in the impedance of the first and second impedance means.

3. The circuit as set forth in claim 2 wherein the first temporary charge storage means includes a first storage capacitor and the second temporary charge storage means includes a second charge storage capacitor, the first and second charge storage capacitors having substantially the same capacitance.

4. The circuit as set forth in claim 3 wherein the first, second, third, and fourth gated switching means each include CMOS transistors.

5. The circuit as set forth in claim 3 wherein the first impedance means is a reference capacitor and the second impedance means is a variable capacitor whose capacitance varies with the sensed condition.

6. The circuit as set forth in claim 5 wherein the reference and variable capacitors include a common electrically conductive layer, a common dielectric layer contacting the common conductive layer, a peripheral supporting structure around an outer periphery of the dielectric layer such that a peripheral portion of the dielectric layer is restrained by the peripheral supporting means from changing a preselected physical property in response to the sensed condition and a central portion of the dielectric layer changes at least said preselected physical property in response to the sensed condition, a peripheral electrically conductive layer contacting the dielectric layer peripheral portion and a central electrically conductive layer contacting the dielectric layer central portion, whereby the capacitance between the central and common conductive layers varies with the sensed condition and the capacitance between the peripheral and common conductive layers is relatively insensitive to the sensed condition, whereby the peripheral conductive layer, the common dielectric layer, and the common conductive layer defining the reference capacitor and the central conductive layer, the common dielectric layer, and the common conductive layer defining the variable capacitor.

7. The circuit as set forth in claim 6 wherein the sensed condition is pressure and the preselected physical property is compression of the dielectric layer to vary the distance between the central and common conductive layers.

8. The circuit as set forth in claim 6 wherein the preselected physical property is a dielectric constant of the dielectric layer.

9. The circuit as set forth in claim 8 wherein the sensed condition is the presence of a chemical substance which interacts with the dielectric layer to vary the dielectric constant.

10. An integrated circuit chip comprising:
    an oscillator for generating an AC driving signal which includings alternate high and low going half cycles;
    a driving amplifier means for constraining the AC driving signal to preselected high and low half cycle amplitudes, the driving amplifier means being operatively connected with the oscillator;

first and second temporary storage capacitors operatively connected with the driving amplifier means;

a bridge including first, second, third, and fourth terminals, the first terminal operatively connected with the first temporary storage capacitor, the third terminal operatively connected with the second temporary storage capacitor, a first gated, solid state switching means operatively connected between the first and second terminals, a second gated, solid state switching means operatively connected between the second and third terminals, a third gated, solid state switching means operatively connected between the third and fourth terminals, and a fourth gated, solid state switching means operatively connected between the fourth and first terminals;

first and second impedance means at least one of which varies with a sensed condition, the first impedance means being operatively connected with the second terminal and the second impedance means being operatively connected with the fourth terminal;

gating control means operatively connected with the oscillator and the first and third gated, solid state switching means for gating the first and third gated, solid state switching means conductive during each high half cycle and operatively connected with the second and fourth gated, solid state switching means for gating the second and fourth gated, solid state switching means conductive during each low half cycle, whereby a charge variation develops between the first and second temporary storage capacitors which charge variation is proportional to the impedance difference of the first and second impedance means; and, a buffer means operatively connected with the first and third terminals for producing an output signal which varies in proportion to the charge variations on the first and second temporary storage capacitors, whereby the output signal varies with the impedance difference between the first and second impedance means.

11. The integrated circuit as set forth in claim 10 wherein the first, second, third, and fourth gated, solid state switching means each include at least one transistor.

12. The integrated circuit as set forth in claim 10 wherein the first, second, third, and fourth gated, solid state switching means each include CMOS transistor pairs.

13. The integrated circuit as set forth in claim 10 wherein the oscillator generates a square wave.

14. The integrated circuit as set forth in claim 10 further including a compensation circuit operatively connected with the buffer means for adjusting the output signal for offset bias and variations in environmental changes, such as temperature and the like.

15. The integrated circuit as set forth in claim 10 further including a coding means operatively connected with the buffer means for coding the output signal into a preselected format.

16. The integrated circuit as set forth in claim 15 wherein the coding means digitally encodes the output signal.

17. The integrated circuit as set forth in claim 10 wherein the first impedance means is a reference capacitor and the second impedance means is a variable capacitor.

18. The integrated circuit as set forth in claim 17 wherein the reference and variable capacitors include a common electrically conductive layer, a common dielectric layer contacting the common conductive layer, a peripheral supporting structure around an outer periphery of the dielectric layer such that a peripheral portion of the dielectric layer is restrained by the peripheral supporting means from changing a preselected physical property in response to the sensed condition and a central portion of the dielectric layer changes at least said preselected physical property in response to the sensed condition, a peripheral electrically conductive layer contacting the dielectric layer peripheral portion, and a central electrically conductive layer contacting the dielectric material central portion, whereby the capacitance between the central and common conductive layers varies with the sensed condition and the capacitance between the peripheral and common conductive layers is relatively insensitive to the sensed condition.

19. A capacitive transducer comprising:
a sensed condition insensitive reference capacitor;
a sensed condition sensitive variable capacitor disposed in sufficient property that both the reference and variable capacitors are subject to sensed condition variations; and,
a capacitance difference measuring circuit operatively connected with the reference and variable capacitors for measuring the difference in the capacitance of the reference and variable capacitors and producing an output signal which varies in proportion to the capacitance difference.

20. The transducer as set forth in claim 19 wherein the reference and variable capacitors include a common electrically conductive layer; a common, compressible dielectric layer which has a preselected physical property that varies with the sensed condition disposed in contact with the common electrical layer, at least a central portion of the dielectric layer undergoing changes in the preselected physical property with changes in the sensed condition; a sensed condition insensitive peripheral supporting means disposed peripherally around the dielectric layer to restrain a peripheral portion of the dielectric layer from undergoing changes in the preselected physical property with changes in the sensed condition; a peripheral conductive layer disposed in contact with the peripheral dielectric layer portion; and a central conductive layer disposed in contact with the central dielectric layer portion; whereby the reference capacitor is defined by the peripheral conductive layer and at least the peripheral portion of the dielectric layer and the common conductive layer and the variable capacitor being defined by the central conductive layer and at least the central portion of the dielectric layer and the common conductive layer such that the capacitance of the variable capacitor varies and the capacitance of the reference capacitor remains substantially unchanged with changes in the sensed condition.

21. The transducer as set forth in claim 20 wherein the preselected physical property is compression and the sensed condition is pressure such that the central and common conductive layers move closer together with increased pressure to vary the capacitance.

22. The transducer as set forth in claim 20 wherein the preselected physical property is a dielectric constant and the sensed condition varies the dielectric constant such that the capacitance of the variable capacitor varies with the sensed condition.

23. The transducer as set forth in claim 20 wherein the central conductive layer is substantially circular and the peripheral conductive layer is substantially a circular annulus.

24. The transducer as set forth in claim 20 wherein the capacitance difference measuring circuit includes at least first and second temporary storage capacitors and a switching circuit for cyclically connecting the reference capacitor with the first and second storage capacitors alternately and for connecting the variable reference capacitor alternately with the other of the first and second temporary storage capacitors.

25. The transducer as set forth in claim 24 wherein the capacitance difference measuring circuit further includes a square wave oscillator for generating a square wave driving signal having alternating high and low half cycles, the square wave oscillator being operatively connected with the first and second temporary storage capacitors, the switching circuit further including a first gated switching means operatively connected between the first temporary storage capacitor and the peripheral conductive layer, a second switching means operatively connected between the peripheral conductive layer and the second storage capacitor, a third gated switching means operatively connected between the second temporary storage capacitor and the central conductive layer, a fourth gated switching means operatively connected between the central conductive layer and the first temporary storage capacitor, and a gating control means operatively connected with the oscillator and with the first, second, third, and fourth gated switching means for gating the first and third switching means conductive during each high half cycle and gating the second and fourth switching means conductive during each low half cycle.

* * * * *